(12) United States Patent
McCallister

(10) Patent No.: US 8,804,873 B1
(45) Date of Patent: Aug. 12, 2014

(54) COMMUNICATION SYSTEM AND METHOD WITH PAPR; AND BACKOFF CONFIGURED FOR EQUILIBRIUM

(71) Applicant: CrestCom, Inc., Scottsdale, AZ (US)

(72) Inventor: Ronald Duane McCallister, Scottsdale, AZ (US)

(73) Assignee: CrestCom, Inc., Scottsdale, AZ (US)

( * ) Notice: Subject to any disclaimer, the term of this patent is extended or adjusted under 35 U.S.C. 154(b) by 0 days.

(21) Appl. No.: 13/766,501

(22) Filed: Feb. 13, 2013

(51) Int. Cl.
*H04L 25/03* (2006.01)
*H04L 1/00* (2006.01)

(52) U.S. Cl.
CPC .................................. *H04L 1/0023* (2013.01)
USPC ........... 375/297; 375/296; 330/278; 330/291; 455/114.3; 455/115.3

(58) Field of Classification Search
CPC .......... H03F 1/3247; H03F 2201/3233; H03F 1/2141; H03F 2200/451; H03F 1/32; H03F 3/189; H03F 2200/372; H03F 2200/465; H03F 2201/3227; H03F 2200/393; H04B 1/0475; H04B 17/0067; H04B 2001/0416; H04B 7/061; H03G 1/04; H03G 3/20; H03G 3/301
USPC ......... 375/285, 295, 296, 297; 455/501, 63.1, 455/67.11, 91, 114.2, 114.3, 115.1, 115.3, 455/115.4, 127.1, 127.2; 330/278, 291
See application file for complete search history.

(56) References Cited

U.S. PATENT DOCUMENTS

| | | | |
|---|---|---|---|
| 6,160,449 A | 12/2000 | Klomsdorf et al. | |
| 7,295,816 B2 | 11/2007 | McCallister | |
| 7,469,491 B2 * | 12/2008 | McCallister et al. | ......... 375/296 |
| 7,747,224 B2 | 6/2010 | McCallister et al. | |
| 7,797,013 B2 | 9/2010 | Skarby et al. | |
| 8,185,065 B2 | 5/2012 | McCallister et al. | |
| 2006/0126748 A1 | 6/2006 | Lin et al. | |
| 2007/0264947 A1 * | 11/2007 | Rozenblit et al. | .......... 455/127.2 |
| 2009/0191907 A1 | 7/2009 | McCallister et al. | |
| 2010/0002784 A1 | 1/2010 | Hlinka et al. | |
| 2011/0064162 A1 | 3/2011 | McCallister et al. | |
| 2012/0189070 A1 | 7/2012 | Kroeger | |
| 2013/0141160 A1 * | 6/2013 | Ohkawara et al. | ............. 330/149 |
| 2013/0195221 A1 * | 8/2013 | Lozhkin | ........................ 375/297 |

OTHER PUBLICATIONS

Hyunchul Ku, "Behavioral Modeling of Nonlinear RF Power Amplifiers for Digital Wireless Communication Systems with Implications for Predistortion Linearization Systems", A Dissertation Presented to the Academic Faculty to Georgia Institute of Technology, Oct. 2003, pp. 1-182, Georgia.

(Continued)

*Primary Examiner* — Dac Ha
(74) *Attorney, Agent, or Firm* — Schmeiser, Olsen & Watts LLP; Lowell W. Gresham

(57) ABSTRACT

A communication system (20) includes a transmitter (22) having a peak controller (38) which controls PAPR to operate in accordance with a noise constraint. A backoff controller (60) operates in conjunction with an amplifier section (46) to cause the amplifier section (46) to maximize the amplification it applies while maintaining a predetermined degree of amplifier linearity. The noise constraint is provided by an equilibrium estimator (64) that provides a noise target parameter (66) to the peak controller (38). The noise target parameter (66) is configured to identify the transmitter's equilibrium point (126). The equilibrium point (126) is that signal-to-noise ratio (SNR) for the signal (26) broadcast from the transmitter (22) where a demodulator (118) in a receiver (24) will experience a reduced SNR if the transmitted signal (26) SNR either increases or decreases.

29 Claims, 8 Drawing Sheets

(56) References Cited

OTHER PUBLICATIONS

Khaled M. Gharaibeh et al., "Accurate Estimation of Digital Communication System Metrics—SNR, EVM and p in a Nonlinear Amplifier Environment", ARFTG Microwave Measurements Conference IEEE, Dec. 2-3, 2004, pp. 41-44, Dept. of Electr. & Comput. Eng., North Carolina State University, Raleigh, NC.

Preben Mogensen et al., "LTE Capacity Compared to the Shannon Bound", Vehicular Technology Conference IEEE, Apr. 22-25, 2007, pp. 1234-1238, VTC 2007—Spring IEEE 65th, Dublin.

Tektronix, "cdmaOne BTS Measurement Solutions", pp. 7-10, 2010, www.tektronix.com/commtest.

PCT International Search Report and the Written Opinion of PCT/US14/15669, ISA, Jun. 3, 2014.

* cited by examiner

COMMUNICATION SYSTEM AND METHOD WITH PAPR; AND BACKOFF CONFIGURED FOR EQUILIBRIUM

TECHNICAL FIELD OF THE INVENTION

The present invention relates generally to the field of radio-frequency (RF) communication systems. Moreover, the present invention relates to operating circuits and/or processes which reduce peak-to-average power ratio (PAPR) in communication signals broadcast from transmitters and which control amplifier backoff. More specifically, the present invention relates to controlling transmitter PAPR and backoff systems so that the transmitter operates at an estimated equilibrium point. The equilibrium point is that signal-to-noise ratio (SNR) for the signal broadcast from the transmitter where a demodulator in a receiver will experience a reduced SNR if the transmitted signal SNR either increases or decreases.

BACKGROUND OF THE INVENTION

Signal-to-noise ratio (SNR) is an important parameter in the design and operation of communication systems. Communication signals take many forms within a communication system. These forms include a signal that has been modulated with user-supplied information and which is processed within a transmitter into an upconverted analog RF communication signal and an amplified RF communication signal that is broadcast from the transmitter. These forms also include an analog RF communication signal applied at the front-end of a receiver, and a downconverted communication signal applied to a demodulator in the receiver. Many of these forms of the communication signal are composite signals for which one portion of the signal power is a usable and desirable part that conveys the user-supplied information and another portion of the signal power is an unusable and undesirable part that impedes the extraction of the user-supplied information by the receiver. The signal part of the SNR is considered to be the useable portion of a communication signal while the noise part is considered to be the unusable portion. SNR is the ratio formed by dividing the signal part by the noise part. One of the goals of conventional communication systems has been to maximize the signal portion and minimize the noise portion throughout the communication system to achieve as high an SNR as reasonably possible for a given set of circumstances. Conventionally, a higher SNR can be translated into a higher link capacity, lower power consumption, more efficient spectrum usage, greater range of communication, and the like.

For a communication system, an SNR is typically relevant only for the in-band portion of the communication signal. But out-of-band considerations also play a role. When considering an amplified communication signal broadcast from an RF transmitter, the transmitter's amplifier is primarily responsible for providing the signal's power. But the amplifier may be prevented from providing the maximum amount of power it is capable of providing. The governmental regulatory agencies that license RF spectrum for use by RF transmitters define spectral masks with which transmitters should comply. The spectral masks set forth how much RF energy may be transmitted from the RF transmitters at various in-band and out-of-band frequencies. As transmitter technology has advanced, and as increasing demands have been placed on the scarce resource of the RF spectrum by the public, the spectral masks have become increasingly strict. In other words, very little energy outside of an assigned frequency band is permitted to be transmitted from an RF transmitter. Many popular modern modulation techniques, such as CDMA, QAM, OFDM, and the like, require the amplifier to perform a linear amplification operation. But any deviation from perfect linearity in the amplification process causes spectral regrowth, where the amplified signal includes more out-of-band RF energy than is present in the form of the communication signal presented to the amplifier for amplification. Regulatory spectral masks require the amplifier's linearity to be at a very high level so that very little of the signal's power appears outside the spectral mask.

One of the ways to achieve the high degree of linearity imposed by a spectral mask is through the use of an input power backoff controller. The input power backoff controller causes the communication signal being amplified in a transmitter's amplifier section to receive the maximum amount of amplification that the amplifying section can deliver at all times without causing a violation of the spectral mask. Thus, the backoff controller imposes an upper limit on the signal portion of the communication signal broadcast from the transmitter. But it also controls the amplifier section so that the amplifier adds very little in-band and out-of-band noise to the communication signal. Thus, the backoff controller may cause the signal level to rise and fall as it continuously adjusts to better maximize amplification without violating a spectral mask, but the noise contributed by the amplifier remains at such a low level that it satisfies the spectral mask both before and after any such adjustments.

Conventional transmitters occasionally include a peak controller which controls a peak-to-average-power ratio (PAPR) parameter of the communication signal that will subsequently be amplified before being broadcast from the transmitter. One example of a PAPR reduction circuit is described in U.S. Pat. No. 7,747,224, issued 29 Jun. 2010, and entitled "Method and Apparatus For Adaptively Controlling Signals", which is incorporated by reference in its entirety herein. A PAPR reduction circuit like the one described in U.S. Pat. No. 7,747,224 and elsewhere, reduces the PAPR of the communication signal prior to amplification. Peak reduction is desirable because it allows the transmitter's amplifier to operate at a lower backoff point relative to average signal power. By operating at a lower average power backoff point, average signal power may be increased, for example through the operation of the backoff controller, thereby increasing the signal portion of the communication signal's SNR. Other advantages follow, including operating the amplifier at a greater level of power added efficiency (PAE), more link capacity, an ability to use a lower cost amplifier, efficiency improvements in the use of the spectrum, and the like.

But the benefits of peak reduction come at a cost. In particular, the peak reduction process introduces noise into the communication signal, and the amount of noise introduced increases as more peak reduction is achieved. The peak controller is desirably configured so that this noise is primarily located in-band and so that no spectral mask violations occur. Usually, meaningful amounts of peak reduction occur where the peak controller has introduced such a significant amount of noise that the noise contributed by the amplifier and other downstream sections of the transmitter may be ignored in SNR characterizations of the communication signal. This presents a situation where a transmitter's PAPR and backoff systems operating together bond signal and noise parameters of the communication signal together so that a decrease in SNR is accompanied by an increase in signal, and an increase in SNR is accompanied by a decrease in signal.

Industry-standardized specifications have been proposed and/or promulgated so that radio equipment manufacturers can know how to configure their equipment to successfully communicate with the equipment of other manufacturers. Such specifications set stringent noise specifications for communication signals broadcast from transmitters. The major standards set forth these specifications in the form of an error vector magnitude (EVM) specification or, for CDMA-based systems, a waveform quality factor (ρ) specification. A relative constellation error (RCE) metric is also defined, where RCE is nearly interchangeable with EVM but is given a different label due to the use of a different measurement technique.

EVM is often designated as:

$$EVM = 100 \times \sqrt{\frac{N_T}{S}} = \frac{100}{\sqrt{SNR}}$$

where $N_T$ represents a transmitter's broadcast communication signal's noise power and S represents the signal power. The constant value of one-hundred is included so that EVM will be expressed as a percentage. Thus, EVM is a specification's way of characterizing essentially the same phenomenon that is expressed using the SNR parameter, i.e., a ratio between signal and noise, although it may be accompanied by a precise definition of a measuring procedure. EVM increases as SNR decreases. As a typical example, EVM may be set at around 17% for a QPSK modulation at rate ½ encoding. This is equivalent to an SNR of 34.6, or 15.4 dB when expressed in decibels. Different EVM values are specified for different specification-compliant modulation and coding parameters. The standards specify EVM/RCE to decrease (or equivalently for SNR to increase) as the modulation and coding parameters change to accommodate increased link capacity. The waveform quality factor ρ is a similar metric that is directly related to SNR and EVM. EVM may be expressed as:

$$EVM = \sqrt{\left(\frac{1}{\rho}\right) - 1}$$

Most conventional transmitters, including those with PAPR and backoff systems and the above-discussed U.S. Pat. No. 7,747,224, teach controlling their PAPR and backoff systems to rigidly and directly comply with the dictates of industry standard EVM, RCE, or ρ specifications. But one example of a transmitter with PAPR and backoff systems that complies with the dictates of industry standard EVM specifications in a less direct manner is described in U.S. Publication No. 2011/0064162, published 17 Mar. 2011, and entitled "Transmitting Unit That Reduces PAPR and Method Therefor", which is incorporated by reference in its entirety herein. The transmitter of U.S. Publication No. 2011/0064162 teaches that the EVM specification is entirely appropriate for the various modulation and coding parameters that are set forth in the specification, but that in certain situations other optional encoding schemes may achieve coding gain relative to corresponding non-optional coding schemes. For example, an optional iterative encoding/decoding scheme or a block encoding scheme characterized by large amounts of latency may be usable in some situations to improve coding gain for the communication link. In these situations, the coding gain should permit a corresponding relaxation in the EVM specification to an alternate EVM point that achieves an equivalent SNR at the receiver. But the major industry standard specifications do not define any such alternate EVM point. Thus, U.S. Publication No. 2011/0064162 teaches operating a transmitter at a technically noncompliant EVM point to compensate for also operating with optional alternative coding parameters to achieve the same SNR result in the receiver that the specification achieves with non-optional coding parameters. In other words, it teaches operating with adherence to the spirit of the EVM specifications if not technically within the letter of the EVM specifications.

Conventional communication systems and transmitters have failed to appreciate that, in some situations honoring EVM, RCE, or ρ specifications, whether directly as taught in U.S. Pat. No. 7,747,224 or indirectly as taught in U.S. Publication No. 2011/0064162, actually harms communication link integrity even when other communication link parameters are compliant with the specifications. Harm results in two different ways. In some situations, receiver SNR may experience an undesirable decrease when operating a transmitter below EVM specifications (ie., at even less transmitter noise than is specified relative to signal) and a desirable increase when nevertheless operating above EVM specifications (ie., at more transmitter noise than is permitted relative to signal). This type of operation leads to lower link capacities than are readily achievable at the same power levels and costs and to a reduced efficiency in spectrum usage. Moreover, when operating in an SNR region that extends up to an equilibrium point, receiver SNR may decrease more the further below the EVM specifications a transmitter operates, and receiver SNR may increase more the further above the EVM specifications a transmitter operates. In other words, the major industry standards and the conventional equipment which are provided and/or proposed to comply with the major industry standards fail to appreciate the existence of any equilibrium point, where the equilibrium point is that signal-to-noise ratio (SNR) for the signal broadcast from the transmitter where a demodulator in a receiver will experience a reduced SNR if the transmitted signal SNR either increases or decreases.

And, in these situations, communication link robustness suffers, further harming communication link integrity. Communication links desirably remain operational near their link capacity at all times. Otherwise, the spectrum is not being used efficiently. But communication links operate in a dynamic environment that includes interference, fades, and switching between different coding and modulation formats. Link interference effects, fading effects, and coding/modulation switching discontinuity effects may all be worse when operating within mandated EVM specifications but could all be improved by operating outside mandated EVM specifications.

These situations occur where transmitters employ both PAPR controllers and backoff controllers. In these transmitters, since signal and noise are operationally bonded together, more operational transmitter noise yields a greater signal level, albeit at a lower SNR or higher EVM level. Unfortunately, industry standard specifications mandate operation in this region where communication link harm results from adhering to EVM or corresponding specifications.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
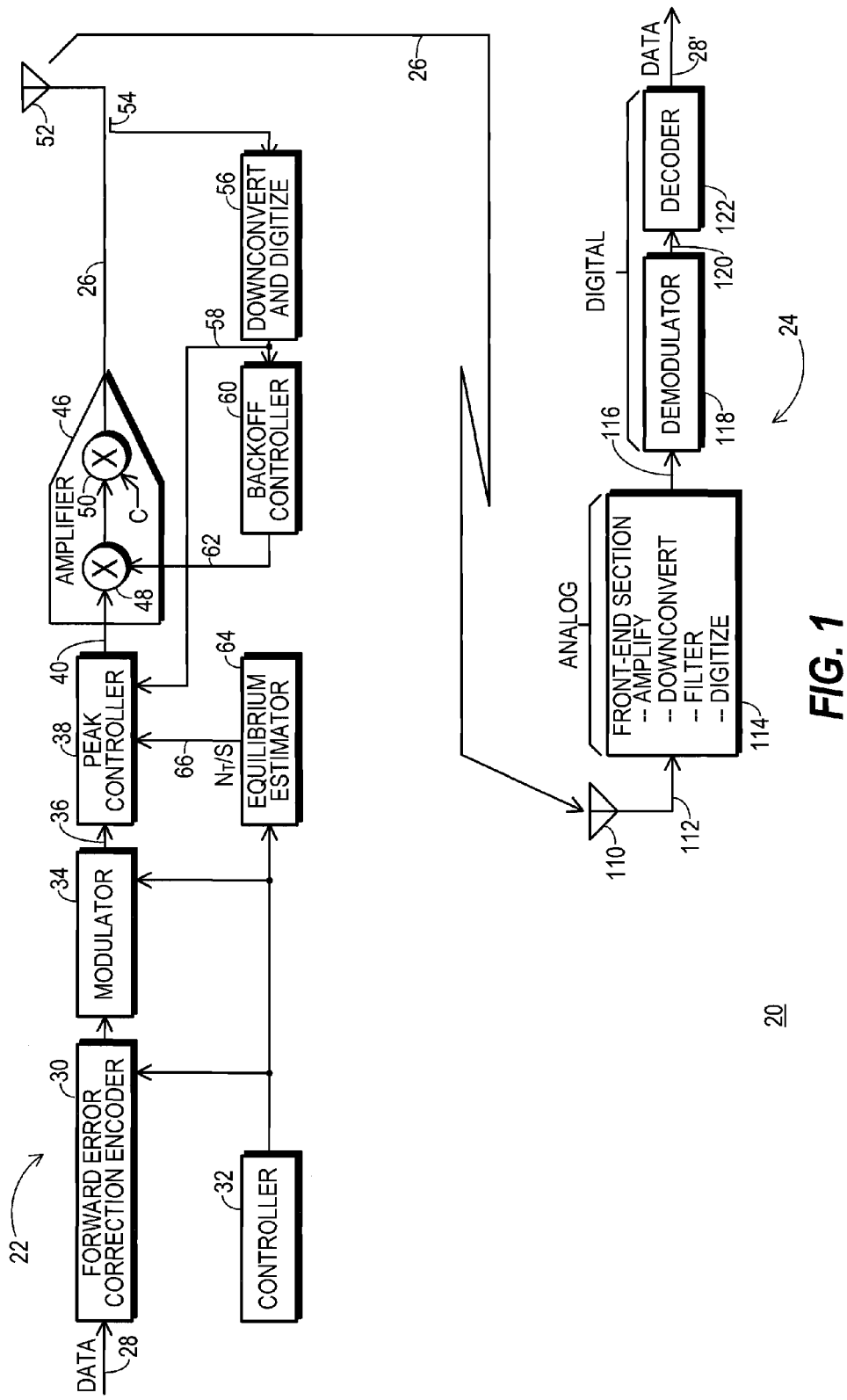
FIG. 1 shows a simplified block diagram of a communication system that includes a transmitter and a receiver configured in accordance with one embodiment of the present invention.

FIG. 1 shows a simplified block diagram of a communication system 20 that includes a transmitter 22 and a receiver 24 configured in accordance with one embodiment of the present invention. In the embodiment explicitly depicted in the figures, transmitter 22 is configured to wirelessly transmit an RF communication signal 26 capable of being demodulated at receiver 24. Communication system 20 may include any number of similarly configured transmitters and any number of similarly configured receivers 24, and any radio device configured to operate within communication system 20 may include both a transmitter 22 and a receiver 24. Those skilled in the art will appreciate that the present invention may also be used in other types of communication systems, including a communication system that transmits optical signals through an optical transmission medium, a system that transmits signals to a magnetic recording medium, and in other applications, such as audio amplification.

Raw user information to be communicated through communication system 20 is presented to transmitter 22 in the form of one or more data streams 28. A data stream 28 may characterize real-time signals such as voice or video, or data stream 28 may represent non-real-time information, such as data files, packets, and the like. A single data stream 28 may be provided to a transmitter 22 located in an individual's subscriber unit of communication system 20, or multiple data streams 28 may be provided to a transmitter 22 located in a base station of communication system 20. Data stream 28 is provided to an input of a forward error correction encoder 30.

Encoder 30 alters data stream 28 to encode the data by introducing forward error correction redundancy which will aid a complementary decoder located in receiver 24 in detecting whether one or more errors are present at any given time and in correcting those errors.

Desirably, encoder 30 implements a concatenated coding scheme in which an outer code is used with an inner code. The outer code may be configured as a Reed-Solomon block code, and the inner code may be a trellis convolutional code. But other encoding schemes may alternatively be used. The encoding scheme is desirably configured in accordance with coding parameters supplied by a controller 32 to achieve a target bit error rate (BER) that is appropriate for the current signal-to-noise ratio (SNR) conditions of the communication link between transmitter 22 and receiver 24 and that maximizes link capacity. For example, the coding parameters may include a code rate parameter which controls the robustness of the inner convolutional code. And, the coding parameters may include other parameters that control the operation of the outer Reed-Solomon block code, or may specify the use of another type of coding, such as iterative encoding.

An encoded data stream generated in encoder 30 passes to a modulator 34. In modulator 34 the encoded data stream is digitally modulated using a suitable form of digital modulation, such as QPSK, CDMA, OFDM, or the like. The precise form of modulation implemented in modulator 34 is desirably selected in accordance with modulation parameters supplied by controller 32. For example, such modulation parameters may specify whether to use a BPSK, QPSK, 16-QAM, or 64-QAM modulation scheme to achieve a target bit error rate (BER) that is appropriate for the current signal-to-noise ratio (SNR) conditions of the communication link between transmitter 22 and receiver 24 and that maximizes link capacity. Together, the coding and modulation parameters supplied to encoder 30 and modulator 34 are configured with the intent of supporting communication at the maximum rate for data stream 28 that the communication link will support at the time.

When multiple data streams 28 are provided to transmitter 22, the multiple streams may be combined into a single data stream in modulator 34. Modulator 34 produces a modulated communication signal 36. A communication signal, such as modulated communication signal 36 and others discussed below, is an electronic signal that may undergo a variety of different processing steps and be represented in a variety of different ways throughout communication system 20, including as one or more digital streams of data or as one or more analog signals. A communication signal conveys modulated information and/or data provided by data stream(s) 28. The transmission of this information and/or data is the primary purpose of communication system 20, transmitter 22, and receiver 24. Any communication signal within communication system 20 can be demodulated or otherwise processed to recover the information and/or data. While a communication signal may have received a wide variety of processing steps, such steps do not destroy the information and/or data conveyed in amplitude and/or phase of a communication signal.

Modulated communication signal 36 may have undesirably high peaks, causing a peak-to-average power ratio (PAPR) parameter to be undesirably high as well. Accordingly, an output of modulator 34 couples to an input of a peak controller 38. Peak controller 38 processes modulated communication signal 36 to reduce or otherwise control its PAPR. Due to the processing applied to the communication signal by peak controller 38, a peak-reduced form 40 of the communication signal generated by peak controller 38 exhibits a lower PAPR than modulated signal 36. Peak controller 38 is desirably implemented so that peak-reduced signal 40 remains compatible with a spectral mask with which transmitter 22 is required to comply by governmental or other regulations.

Figure 2:
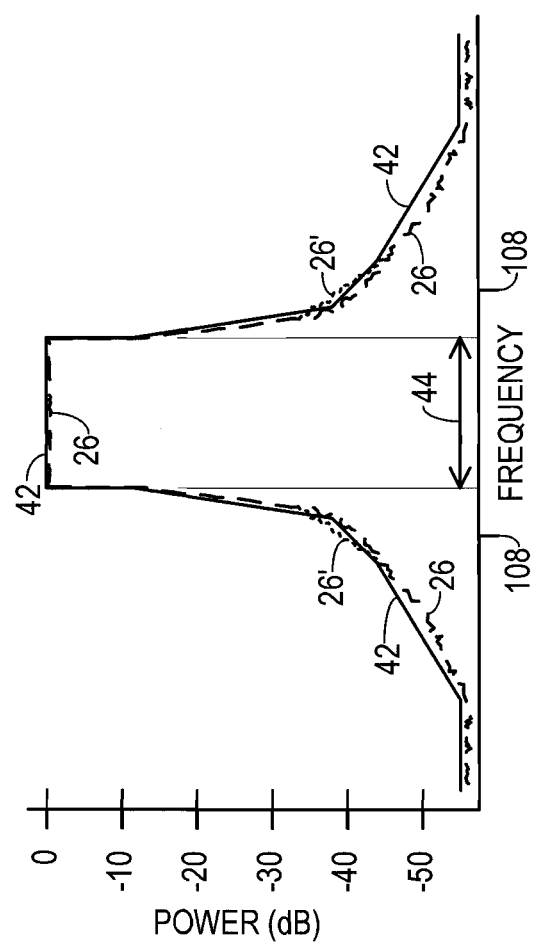
FIG. 2 shows a chart that graphically depicts an exemplary spectral mask relative to an exemplary spectral plot of an amplified communication signal broadcast from the transmitter depicted in FIG. 1.

FIG. 2 shows a chart that graphically depicts an exemplary spectral mask 42 relative to an exemplary spectral plot of RF communication signal 26 broadcast from transmitter 22. Spectral mask 42 is depicted as permitting signal 26 to exhibit a certain amount of power, labeled 0 dB in FIG. 2, within an assigned frequency range that defines a bandwidth 44. In order for transmitter 22 to operate in compliance with spectral mask 42, the power of signal 26 needs to remain beneath the contour of spectral mask 42, both in-band (i.e., within bandwidth 44) and out-of-band (ie., outside bandwidth 44). Desirably, both modulated signal 36 (FIG. 1) and peak-reduced signal 40 (FIG. 1) exhibit a bandwidth substantially equal to bandwidth 44. But signals 36 and 40 are located at baseband rather than at RF, where FIG. 2 depicts bandwidth 44.

Referring back to FIG. 1, peak-reduced communication signal 40 drives an amplifier section 46. For the purposes of this description, amplifier section 46 is viewed as having two components, a variable gain stage 48 followed by a constant-gain power stage 50. Amplifier section 46 applies amplification to peak-reduced signal 40 to produce RF communication signal 26, which is an amplified form of the communication signal. In the preferred embodiment, variable gain stage 48 is implemented by a digital multiplication circuit, and constant-gain power stage 50 is implemented using an RF, analog, amplifying semiconductor device, such as a field effect transistor, bipolar transistor, or the like. Other well understood sections routinely included in conventional transmitters and also included in transmitter 22 are omitted from FIG. 1 in the interest of simplicity, including a digital-to-analog conversion section, an upconversion section, a local oscillator, a filtering section, an amplifier biasing section, matching networks, and the like. Likewise, the preferred embodiment includes a digital predistortion section located between peak controller 38 and amplifier section 46, which has been omitted from FIG. 1 for simplicity. In alternate embodiments, variable gain stage 48 may be implemented using analog components, either at baseband or RF, and in other alternate embodiments variable gain stage 48 may be combined with constant-gain power stage 50 to form a variable gain amplifier. And, in some embodiments a bias controller may be added to improve the power added efficiency (PAE) of power stage 50.

Amplifier section 46 is configured through variable gain stage 48 to apply amplification to peak-reduced signal 40 at a controllable input power backoff level and at a degree of linearity that corresponds to the backoff level. In addition to supplying amplified signal 26 to an antenna 52 so that signal 26 is broadcast away from transmitter 22, a small portion of signal 26 is routed through an RF coupler 54 to a downconversion and digitization section 56. Section 56 generates a digital baseband version of the communication signal, referred to as feedback signal 58 herein. Feedback signal 58 is an extra wideband signal which accommodates both the in-band portion 44 (FIG. 2) of signal 26 and at least some of the nearby out-of-band portions of signal 26. Feedback signal 58 is applied to a backoff controller 60 which supplies a gain-adjustment signal 62 to variable gain stage 48 of amplifier section 46. Feedback signal 58 is also applied to peak controller 38.

Transmitter 22 includes an equilibrium estimator 64 that receives the modulation and coding parameters that controller 32 also supplies to modulator 34 and encoder 30. Equilibrium estimator 64 provides a noise target parameter 66 to peak controller 38. Noise target parameter 66 is specifically configured to account for the PAPR characteristics and amplifier section 46 characteristics of transmitter 22, and it changes in value to track changes in modulation and coding parameters.

Figure 3:
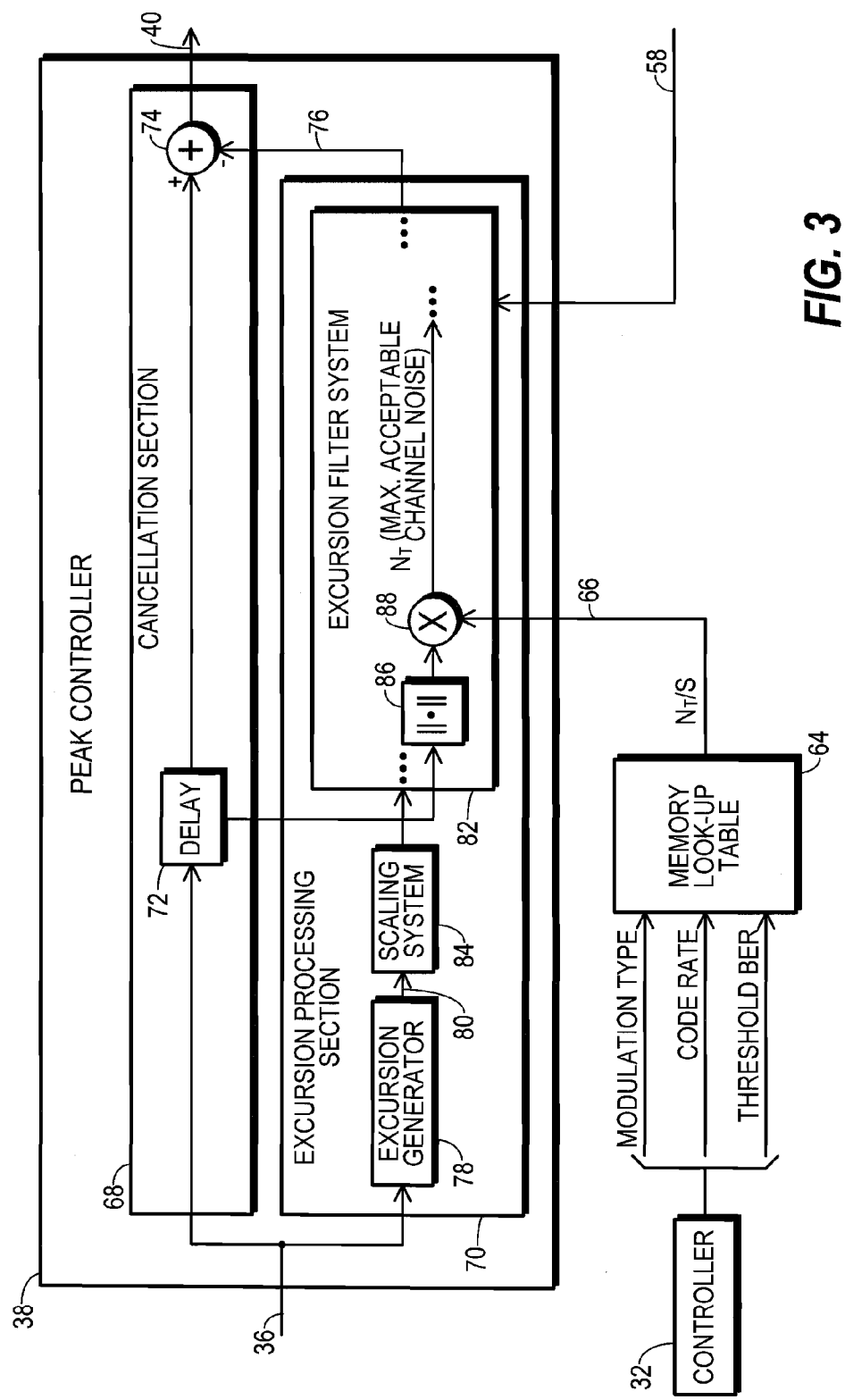
FIG. 3 shows a block diagram of a peak controller portion and an equilibrium estimator portion of the transmitter depicted in FIG. 1.

FIG. 3 shows a block diagram which provides more details of one suitable embodiment of peak controller 38 and of equilibrium estimator 64. As depicted in FIG. 3, peak controller 38 includes a cancellation section 68 and an excursion processing section 70. Both of sections 68 and 70 receive modulated communication signal 36.

In cancellation section 68, modulated signal 36 is suitably delayed in a delay element 72. The delayed version of modulated signal 36 is provided from delay element 72 to a combiner 74, where a peak-cancelling signal is combined with the delayed version of modulated signal 36 to form peak-reduced communication signal 40. The peak-cancelling signal is essentially noise from the perspective of communication system 20. In other words, it hinders the extraction of user data from amplified RF communication signal 26 (FIG. 1) in receiver 24 (FIG. 1). However, as discussed below it also provides the benefit of allowing the average power level of amplified signal 26 broadcast from transmitter 22 to increase.

Excursion processing section 70 specifically crafts this peak-cancelling signal, referred to below as peak-reduction noise 76, from modulated signal 36 so that it will be effective in reducing the peaks of modulated signal 36 by a precisely controlled amount without increasing the bandwidth of modulated signal 36. An excursion generator 78 processes modulated signal 36 to form an excursion signal 80 that represents only the peaks of modulated signal 36 that are to be reduced. For example, excursion signal 80 may exhibit a signal level of zero at all instants in time where modulated signal 36 is below a threshold, and a signal level equal to the amount by which modulated signal 36 is above the threshold at all other instants in time. If peak controller 38 were to subtract excursion signal 80 from an appropriately delayed version of modulated signal 36, the result would be equivalent to hard-limiting modulation signal 36 at the threshold level. But such an operation would undesirably increase the bandwidth of the resulting hard-limited signal leading to a violation of spectral mask 42 (FIG. 2) and/or introduce more noise into the resulting hard-limited signal than is necessary. Thus, this preferred embodiment of peak controller 38 filters excursion signal 80 in a excursion filter system 82, after scaling excursion signal 80 in a scaling system 84. Filter system 82 ensures that peak-reduction noise 76, which is crafted to cancel peaks from modulated signal 36, exhibits substantially the same bandwidth as modulated signal 36. The filtering operation reduces amplitude in peak-reduction noise 76 compared to the amplitude exhibited by excursion signal 80. This reduction in amplitude is compensated for by scaling system 84 prior to the filtering operation of excursion filter system 82. Additional details concerning the operation of this class of peak controllers are provided by the above-discussed US patent and US Patent Publication which are incorporated by reference herein.

Peak controller 38 is capable of exerting a fairly precise control over the amount of peak reduction achieved, and to exert this control over a fairly wide range of peak reduction. Accordingly, the identification of an appropriate amount of peak reduction to achieve is a metric of interest. For the purposes of efficiently operating power stage 50 of amplifier section 46 and of maximizing the average power exhibited in amplified communication signal 26 without harming linearity, greater amounts of peak reduction are beneficial. Unfortunately, greater amounts of peak reduction (i.e., further decreased peaks in peak-reduced signal 40 compared to modulated signal 36) are achieved by increasing the amount of peak-reduction noise 76 added into the communication signal by peak controller 38. And, the maximum amount of peak reduction achievable plateaus at some level where adding larger and larger amounts peak-reduction noise 76 yields smaller and smaller improvements in peak reduction. Accordingly, an appropriate amount of peak reduction to achieve in peak controller 38 is an amount that meets some form of a noise constraint.

Conventional peak controllers, including the peak controllers discussed in the above-mentioned US patent and US Patent Publication incorporated by reference herein, use an error vector magnitude (EVM) specification imposed by an industry standard, or a similar externally-imposed specification such as a waveform quality factor ($\rho$) or a relative constellation error (RCE), to define this noise constraint. But the use of an externally imposed error constraint dictates characteristics for a transmitter to follow and does not recognize that transmitter characteristics can be taken into account to improve communication link integrity. Communication system 20 and transmitter 22 implement a different noise constraint. The noise constraint used in transmitter 22 is provided through equilibrium estimator 64, which generates noise target parameter 66. Noise target parameter 66 is based in part upon the PAPR performance characteristics, transmitter amplifier section 46 linearity characteristics, and amplifier section 46 dynamic range of the very transmitter 22 for which noise target parameter 66 supplied. Noise target parameter 66 provides a noise constraint geared toward operating transmitter 22 at an equilibrium point. The equilibrium point is that signal-to-noise ratio (SNR) for amplified signal 26 broadcast from transmitter 22 where a demodulator in receiver 24 will experience a reduced SNR if the transmitted signal's SNR either increases or decreases. The value of the equilibrium point is different for different modulation types and coding parameters, such as code rate and threshold BER, and it is different for different transmitters 22 operating in communication system 20.

Referring again to FIG. 3, in a preferred embodiment noise target parameter 66 is provided from equilibrium estimator 64 in the form of a value representing the inverse of an SNR parameter (i.e., $N_T/S$) estimated to characterize amplified signal 26 when transmitter 22 is operating at the equilibrium point. Excursion filter system 82 receives an appropriately delayed version of modulation signal 36 from delay element 72, and converts signal 36 into a magnitude signal in a magnitude formation operation 86 to obtain an indication of the current signal level (S) for the communication signal. This indication and noise target parameter 66 are provided to inputs of a multiplier 88, which multiplies the current signal level (S) by the noise target parameter 66 in an inverse SNR form ($N_T/S$) to obtain a target noise power $N_T$ to be added into the communication signal. This represents the maximum acceptable channel noise for the channel processing the communication signal. In response to feedback signal 58, peak controller 38 measures the noise power $N_T$ in amplified signal 26 and forms a control loop that causes the amount of peak-reduction noise 76 added into the communication signal to yield the targeted noise power needed for operation at the equilibrium point. Whenever the measured noise is less than the target $N_T$, peak-reduction noise 76 is increased; and, whenever the measured noise is greater than the target $N_T$, peak reduction noise 76 is reduced.

In the embodiment depicted in FIG. 3, equilibrium estimator 62 is implemented using memory. Data describing a variety of different noise target parameter 66 values are stored in this memory to implement a look-up table. Parameters provided by controller 32 serve as addresses or indexes to this look-up table. The parameters characterize essentially the same information that controller 32 provides to encoder 30 and modulator 34 to define the BER, coding rate, and modulation type of modulated signal 36. Accordingly, noise target parameter 66 values change when these parameters change for modulated signal 36. The noise target parameter 66 values may be determined and programmed into equilibrium estimator 64 during the manufacturing process and need not be altered thereafter, although nothing requires parameter 66 values to remain entirely static throughout the lifecycle of transmitter 22.

Figure 4:
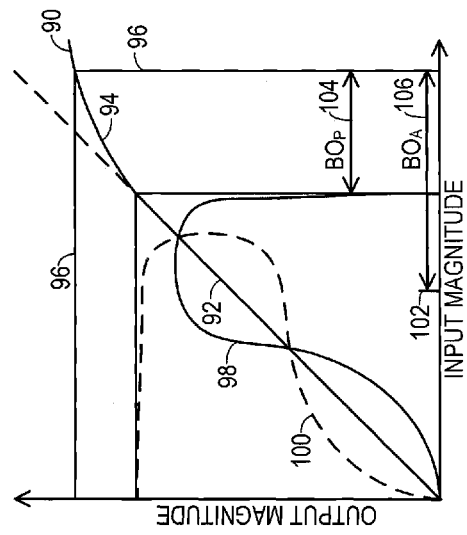
FIG. 4 shows a chart that graphically depicts an exemplary signal magnitude probability density function and an exemplary transfer characteristic of an amplifier section of the transmitter depicted in FIG. 1 while operating with little or no peak reduction.
Figure 5:
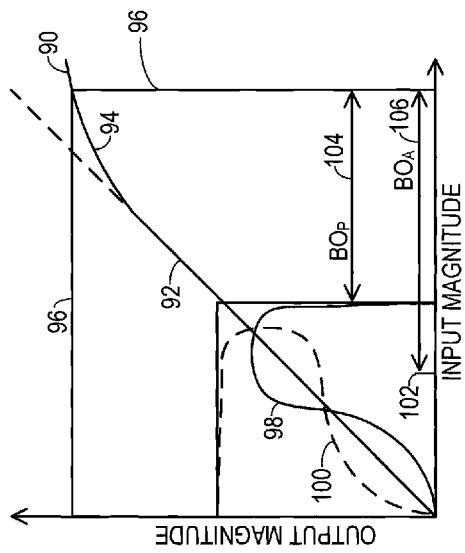
FIG. 5 shows a chart that graphically depicts an exemplary signal magnitude probability density function and the exemplary transfer characteristic of the amplifier section of the transmitter depicted in FIG. 1 while operating with peak reduction but no backoff adjustment in response to the peak reduction.
Figure 6:
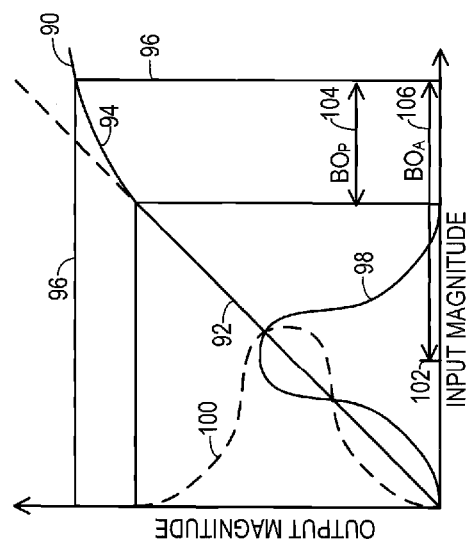
FIG. 6 shows a chart that graphically depicts an exemplary signal magnitude probability density function and the exemplary transfer characteristic of the amplifier section of the transmitter depicted in FIG. 1 while operating with peak reduction and with backoff adjustment in response to the peak reduction.

FIG. 4 shows a chart that graphically depicts an exemplary signal magnitude probability density function and an exemplary transfer characteristic of amplifier section 46 (FIG. 1) while operating at little or no peak reduction. FIG. 5 shows a chart that graphically depicts an exemplary signal magnitude probability density function and the exemplary transfer characteristic of amplifier section 46 while operating with peak reduction but no backoff adjustment in response to the peak reduction. And, FIG. 6 shows a chart that graphically depicts an exemplary signal magnitude probability density function and the exemplary transfer characteristic of amplifier section 46 while operating with peak reduction and with backoff adjustment in response to the peak reduction. Together FIGS. 2 and 4-6 depict the integrated operation of peak controller 38, amplifier section 46, and backoff controller 60 to bond the signal (S) portion and the noise portion ($N_T$) to one another in the SNR parameter that characterizes amplified communication signal 26.

Each of FIGS. 4-6 shows that amplifier section 46 (FIG. 1) has a transfer function 90 which depicts the relationship between input power and output power for amplifier section 46. Transfer function 90 has a linear range 92 and a nonlinear range 94. In linear range 92, transfer function 90 exhibits a linear, substantially straight-line, relationship. In nonlinear range 94, transfer function 90 exhibits a nonlinear relationship often referred to as gain droop. A bias level 96 is depicted for power stage 50 (FIG. 1) of amplifier section 46. Linear range 92 ends and nonlinear range 94 begins at a point less than bias level 96. In an embodiment where a bias controller is added to transmitter 22 to improve the power added efficiency (PAE) of power stage 50, bias level 96 represents the current bias level as provided by the bias controller.

In each of FIGS. 4-6, solid line curve 98 depicts an exemplary probability density function (PDF) of peak-reduced signal 40 and dotted-line curve 100 depicts a corresponding probability density function of amplified signal 26 output by amplifier section 46. The average magnitude for peak-reduced signal 40 is denoted at average power point 102. Those skilled in the art will appreciate that the precise shape of curves 98 and 100 will differ depending upon the modulation type currently being used by transmitter 22 and upon whether a single data stream 28 or multiple data streams 28 are being modulated. And, the location of average magnitude points 102 will likewise differ depending upon these details.

FIG. 4 depicts the application of little or no peak reduction in peak controller 38. This scenario is a hypothetical scenario provided to serve as a baseline for comparison purposes with the scenarios depicted in FIGS. 5-6. During normal operation, transmitter 22 should not operate in the FIG. 4 scenario. But the FIG. 4 scenario may be brought about in transmitter 22 by decreasing peak-reduction noise 76 (FIG. 3) to near zero, which will result from applying a noise target parameter 66 (FIG. 3) of zero or nearly zero from equilibrium estimator 64 to peak controller 38. Peak controller 38 will decrease its peak reduction, which leads to increased peaks in peak-reduced signal 40. In this FIG. 4 scenario, input power PDF 98 exhibits a long, thin tail. In other words, peak-reduced signal 40 seldom exhibits high peaks, but those high peaks are considerably greater than average power point 102.

In the FIG. 4 scenario, in order to maintain linear operation of amplifier section 46 but otherwise achieve the maximum amplification possible from amplifier section 46, the input power backoff level is adjusted by backoff controller 60 so that substantially the entirety of peak-reduced signal 40, including the highest peaks of signal 40, remain within linear range 92 of amplifier section 46. Peak backoff ($BO_P$) 104 represents the difference between the level of the highest peaks in peak-reduced signal 40 and bias level 96. Due to the operation of backoff controller 60, this is also the difference between bias level 96 and the point where linear range 92 ends and nonlinear range 94 begins.

Average backoff ($BO_A$) 106 represents the difference between average magnitude point 102 and bias level 96. In this FIG. 4 scenario, average backoff 106 is undesirably large. The undesirably large average backoff 106 results in poor power added efficiency (PAE) for power stage 50 of amplifier section 46, and an undesirably low signal level (S) for amplified signal 26 broadcast from transmitter 22. On the other hand, the noise level ($N_T$) of signal 26 is low due to the zero or nearly zero level of peak-reduction noise 76 added into the communication signal by peak controller 38. Consequently the SNR for amplified signal 26 is very high.

FIG. 5 depicts the application of peak reduction in peak controller 38, but no adjustment in backoff from the levels depicted for the FIG. 4 scenario. This FIG. 5 scenario may be brought about by freezing the operation of backoff controller 60 and by allowing equilibrium estimator 64 to provide its normal estimate of the equilibrium point as noise target parameter 66. FIG. 5 also depicts a hypothetical scenario presented for comparison with the FIGS. 4 and 6 scenarios. For normal operation, backoff controller 60 should not be frozen.

By using the normal estimate of the equilibrium point for noise target parameter 66, peak controller 38 will increase peak-reduction noise 76 from the amount provided in the FIG. 4 scenario, which will in-turn lead to increased peak reduction by peak controller 38, and to reduced or lower peaks in peak-reduced signal 40. In this FIG. 5 scenario, input power PDF 98 exhibits a short, fat tail. In other words, the peaks are constrained to being much closer to average power point 102. The areas under PDF curve 98 in FIGS. 4 and 5 are equal, and average magnitude points 102 in FIGS. 4 and 5 are little changed. But the area in the long tail from FIG. 4 is now removed and added back, primarily above but closer to average magnitude point 102. Furthermore, average backoff ($BO_A$) 106 is still undesirably large and little changed from the FIG. 4 scenario, but peak backoff ($BO_P$) 104 is much larger than in the FIG. 4 scenario. The undesirably large average backoff 106 again results in poor power added efficiency (PAE) for power stage 50 of amplifier section 46, and an undesirably low signal level (S) for amplified signal 26 broadcast from transmitter 22. Furthermore, the noise level ($N_T$) of signal 26 is now much higher due to the use of an equilibrium point as noise target parameter 66, which yields a much increased level of peak-reduction noise 76 being added into the communication signal. Consequently the SNR for amplified signal 26 has also been lowered considerably from the FIG. 4 scenario. But the FIG. 5 scenario is a hypothetical scenario where noise level ($N_T$) and signal level (S) are independent of each other and not bonded together due to the hypothetical freezing of backoff controller 60.

Turning now to FIG. 6, the effects of unfreezing backoff controller 60 are depicted. No changes are made in peak reduction from the FIG. 5 scenario. FIG. 6 depicts an actual, normal operating scenario for transmitter 22. This FIG. 6 scenario depicts a decrease in the peak backoff ($BO_P$) 104 and in average backoff ($BO_A$) 106 from the levels of the hypothetical FIG. 5 scenario. While peak backoff ($BO_P$) 104 has decreased approximately to the same level as depicted in the FIG. 4 scenario, average backoff ($BO_A$) 106 has now decreased to a level much smaller than either of the hypothetical FIG. 4 or FIG. 5 scenarios. Noise level ($N_T$) and signal level (S) are bonded together in amplified signal 26. A desirably high signal level (S) is now exhibited by amplified signal 26. The SNR of amplified signal 26 is about the same as in the FIG. 5 scenario and much lower than in the FIG. 4 scenario. As is discussed in more detail below, this lowered SNR of amplified signal 26 broadcast from transmitter 22 leads to an increased SNR in receiver 24 over a range of operation that extends up to the equilibrium point.

FIGS. 4-6 show that backoff controller 60 operates as a automatic gain controller (AGC) to maximize the amplification provided by amplifier section 46 while maintaining a predetermined degree of linearity. In normal operational scenarios, backoff controller 60 remains unfrozen. Accordingly, backoff controller 60 continuously adjusts the gain applied in variable gain stage 48 of amplifier section 46. In particular, backoff controller 60 uses a linearity metric to determine when amplifier section 46 has reached a linearity threshold. When linearity falls below the threshold, gain is decreased to improve linearity, and when linearity goes too far above the threshold, gain is increased to increase amplification.

FIG. 2 depicts one suitable linearity metric that backoff controller 60 may monitor to maximize the amplification provided by amplifier section 46 while maintaining a predetermined degree of linearity. In particular, FIG. 2 shows amplified signal 26 as a dashed-line that resides below spectral mask 42, but desirably remains very close to spectral mask 42 to maximize amplification. FIG. 2 further shows a dotted-line 26' which extends slightly above spectral mask 42 at sensitive out-of-band points 108 in spectral mask 42. Amplified signal 26 follows trace 26' when amplification becomes so great that linearity just starts to deteriorate. The deterioration is signified by a small amount of nonlinear amplification that causes spectral regrowth in amplified signal 26, and this spectral regrowth is of a sufficient degree that signal 26 now exceeds spectral mask 42.

Accordingly, in one embodiment backoff controller 60 performs band-pass filtering, followed by a magnitude conversion and a low-pass filtering operation (not shown) to monitor sensitive out-of-band points 108 in feedback signal 58 (FIG. 1). When backoff controller 60 detects a signal level above spectral mask 42, or preferably above a point immediately beneath spectral mask 42 at out-of-band points 108 to provide a suitable margin, gain is reduced by a small amount. When backoff controller 60 detects signal level below spectral mask 42, and preferably below a point immediately beneath spectral mask 42 at out-of-band points 108 to provide a suitable margin, gain is increased by a small amount. Thus, a control loop is established wherein the amplification applied by amplifier section 46 is maximized while maintaining a predetermined degree of linearity.

Referring back to FIG. 1, amplified signal 26 broadcast from transmitter 22 is shown propagating to receiver 24. In particular, signal 26 is applied at an antenna 110 in receiver 24. If we ignore interference for now, then the SNR of an incoming communication signal 112 from antenna 110 should have about the same SNR as signal 26 broadcast from transmitter 22, although the power of both the signal component and the noise component will be greatly reduced due to propagation losses. Incoming signal 112 is applied to a front-end section 114 of receiver 124. Front-end section 114 is constructed primarily from analog components which contribute more noise to incoming signal 112. Front-end section 114 may include devices which amplify, downconvert, filter, and digitize the communication signal. Each of these devices, and particularly those that amplify, introduce their own noise contribution to the communication signal. This collective contribution to the noise of the communication signal by devices in front-end section 114 of receiver 124 is referred to herein as thermal noise $N_{RO}$ to distinguish this component of noise from the transmitter-supplied noise component $N_T$.

After processing in front-end section 114, a digitized baseband form 116 of the communication signal passes to a demodulator 118 in a digital section of receiver 24. Baseband signal 116 includes a signal component ($\alpha S$, where $\alpha$ denotes the propagation loss), a noise component ($\alpha N_T$) contributed by transmitter 22, and another noise component ($N_{RO}$) contributed by front-end section 114. Demodulator 118 performs a complementary process to the process performed by modulator 34 in transmitter 22. In other words, demodulator 118 extracts encoded data 120 from baseband signal 116. Encoded data 120 then passes to a decoder 122, which performs a complementary process to the process performed by encoder 30 in transmitter 22. For example, decoder 122 may implement a Viterbi decoding process for the inner convolutional code and a Berlekamp-Massey decoding process for the outer block code. An estimate 28' of data stream(s) 28 is provided from decoder 122. So long as demodulation is substantially successful, and any demodulation errors can be corrected in decoder 122, estimate data 28' precisely matches data stream(s) 28.

But for demodulation to be considered substantially successful it must deliver less than a threshold BER in encoded data 120, and that threshold BER can only be achieved if the SNR of baseband signal 116 is sufficiently high to do so. FIGS. 7-10 show charts which depict how the above-discussed equilibrium point contributes to providing a robust communication link that is best able to achieve a sufficiently high SNR in baseband signal 116.

Figure 7:
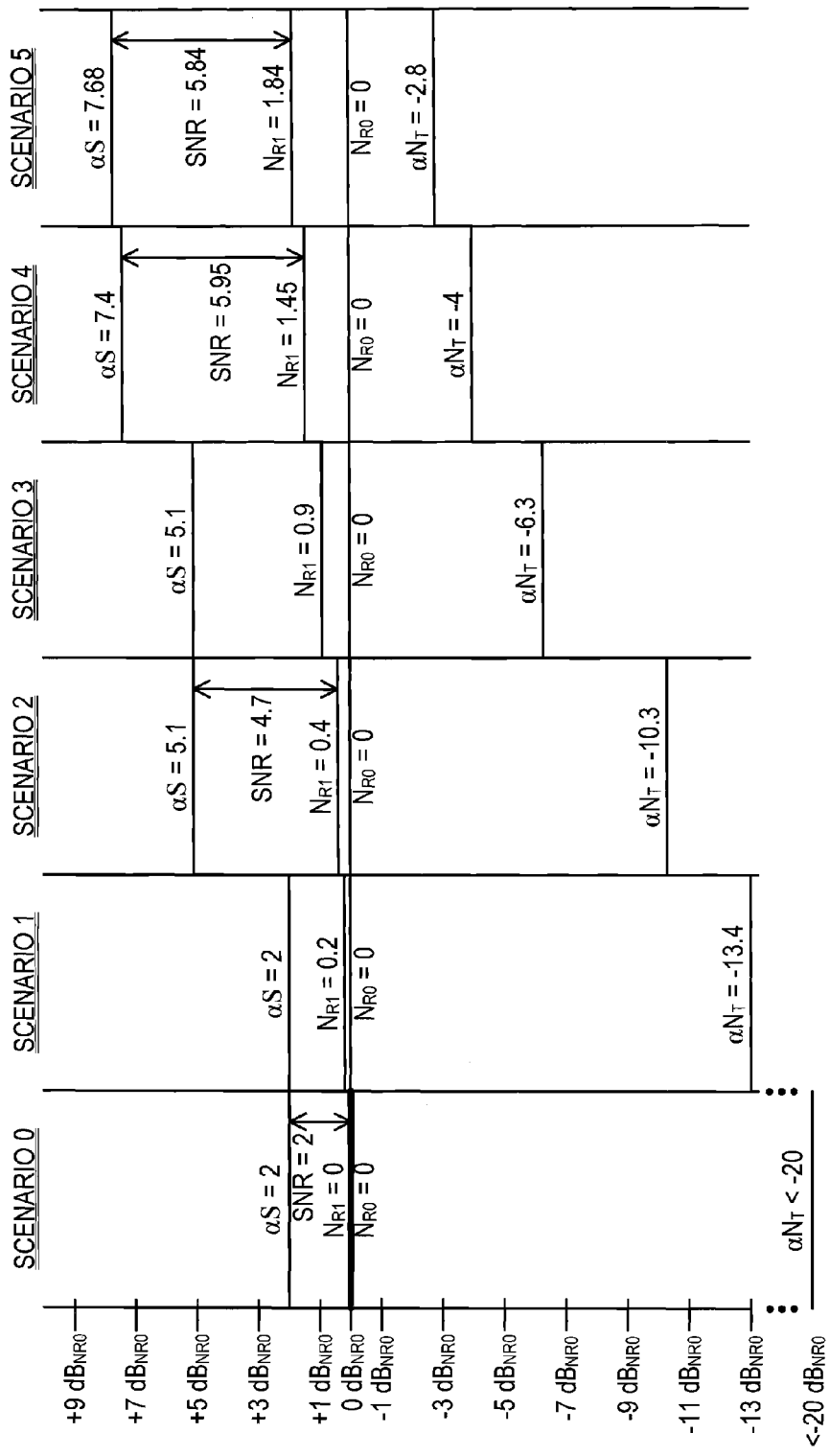
FIG. 7 shows a chart that graphically depicts different signal and noise power levels for six different exemplary scenarios at which the transmitter of FIG. 1 may operate, with a SCENARIO 4 depicting operation at an equilibrium point.

FIG. 7 shows a chart that graphically depicts different signal and noise power levels relevant to baseband signal 116 for six different exemplary scenarios, labeled as SCENARIO 0 through SCENARIO 5, at which transmitter 22 may hypothetically operate. However, only SCENARIO 4 depicts operation at the equilibrium point, as determined by equilibrium estimator 64 (FIGS. 1 and 3). In each scenario, signal and noise power levels are expressed in decibels referenced to the thermal noise $N_{RO}$ contributed by front-end section 114 (FIG. 1) of receiver 24. Moreover, each scenario depicted in FIG. 7 ignores interference, and otherwise represents the use of example modulation and coding parameters where the BER threshold can be just met with baseband signal 116 exhibiting an $SNR_{thresh}$ of 2 dB. The use of 2 dB modulation and coding parameters approximates a QPSK modulation at a coding rate of ½.

In hypothetical scenario 0, transmitter 22 performs no substantial peak reduction but nevertheless transmits signal at a power level S that, after propagation losses, causes the signal level $\alpha S$ in baseband signal 116 to be 2 dB greater than total noise ($N_{RO}$) in baseband signal 116. This hypothetical scenario 0 corresponds to the hypothetical scenario of FIG. 4, discussed above. Total noise $N_{R1}$, equals the arithmetic (not logarithmic) sum of the transmitter-contributed noise $N_T$ and receiver-contributed thermal noise $N_{RO}$ since these two noise contributions are uncorrelated. Since transmitter 22 performs no substantial peak reduction, substantially no peak-reduction noise 76 (FIG. 3) is contributed. For the purposes of FIG. 7 and scenarios 0-5 depicted therein, any transmitter-contributed noise $N_T$ resulting from other processing, including analog processing, of the communication signal in transmitter 22 and is at a low level (e.g., <20 dB). At this low level, $N_T$ makes no significant contribution to the total noise $N_{R1}$. In scenario 0, amplified signal 26 broadcast from transmitter 22 far exceeds all externally imposed EVM (or similar) major industry standards for a QPSK modulation at a coding rate of ½ because no peak-reduction noise 76 is being contributed to the communication signal. But in scenario 0, transmitter 22 is operating far, far below the equilibrium point, and the SNR of baseband signal 116 is just barely adequate to support QPSK modulation at a coding rate of ½.

Moving to hypothetical scenario 1, transmitter 22 is now controlled to operate at an EVM point, but to freeze its back-off controller and forego adjusting the gain of variable gain stage 48 (FIG. 1) in amplifier section 46 (FIG. 1). For the $SNR_{thresh}$ of 2 dB, which is consistent with the major industry standard specifications for a QPSK modulation at a coding rate of ½, this allows peak controller 38 to contribute peak-reduction noise 76 in an amount which causes the EVM of amplified signal 26 to be precisely at 17%. This metric may also be expressed as an inverse SNR ($N_T/S$) of 0.0289, an SNR of 34.6, or an SNR expressed in decibels as 15.4 dB. Transmitter 22 is now contributing the maximum amount of noise permitted for a specification-compliant transmitter, and transmitter SNR decreases in scenario 1 from the SNR achieved in scenario 0. In hypothetical scenario 1, transmitter 22 contributes a considerable amount of noise, so that transmitter-contributed noise $\alpha N_T$ is now at −15.4 dB relative to signal level $\alpha S$, or about −13.4 dB relative to receiver thermal noise $N_{RO}$. The increase in transmitter-contributed noise $\alpha N_T$ causes total noise $N_{R1}$ to increase, but the increase is only 0.2 dB since $\alpha N_T$ is still considerably less than receiver thermal noise $N_{RO}$. In hypothetical scenario 1, the communication link would fail because baseband signal 116 has insufficient SNR (i.e., 2 dB $\alpha S$-0.2 dB $N_{R1}$=1.8 dB SNR) to meet the 2 dB SNR threshold.

Figure 8:
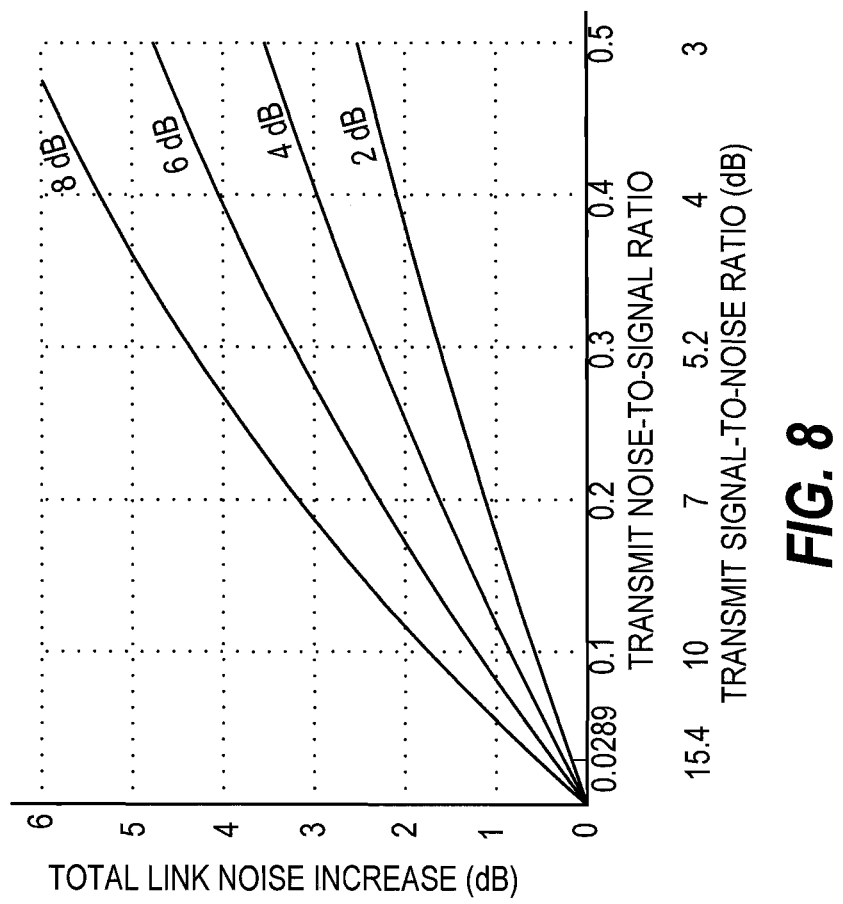
FIG. 8 shows a chart that graphically depicts an exemplary relationship between total link noise increase seen at a receiver's demodulator in response to corresponding SNR in an amplified signal broadcast from the transmitter of FIG. 1.

FIG. 8 shows a chart that graphically depicts an exemplary relationship between total link noise increase seen at a receiver's demodulator (i.e., in baseband signal 116) in response to corresponding SNR in amplified signal 26 broadcast from the transmitter of FIG. 1. As shown in FIG. 8 for the 2 dB curve and operation at a 0.0289 inverse SNR ($N_T/S$) (or equivalently, a 15.4 dB SNR), which represents the EVM point, total link noise $N_{R1}$ increases about 0.2 dB, as also shown in comparing scenario 1 to scenario 0. But FIG. 8 shows this relationship for a wide variety of modulation and coding parameters that can be translated into different threshold BER's using techniques well known to those of skill in the art. The curves of FIG. 8 can be calculated long before transmitter 22 is manufactured. The curves of FIG. 8 are also based upon the receiver thermal noise $N_R$, although the absolute value of receiver thermal noise $N_{RO}$ is not known. Rather, receiver thermal noise $N_{RO}$ remains constant as transmitter-contributed noise $N_T$ changes as demonstrated in the exemplary hypothetical scenario 1, and this relative change causes corresponding changes in total link noise $N_{R1}$, which are reflected in the vertical axis of FIG. 8. But the data depicted in the curves of FIG. 8 reflect the scenario 1 hypothesis of no signal level change at transmitter 22 in response to a change in transmit SNR.

Referring back to FIG. 7, scenario 2 depicts another hypothetical scenario that would result from unfreezing backoff controller 60 from scenario 1 so that variable gain stage 48 of amplifier section 46 introduces sufficient gain to apply the maximum amplification which maintains a predetermined degree of linearity. The amount of gain that can be applied depends upon the characteristics of the specific amplifier section 46 linearity and dynamic range parameters in transmitter 22.

Figure 9:
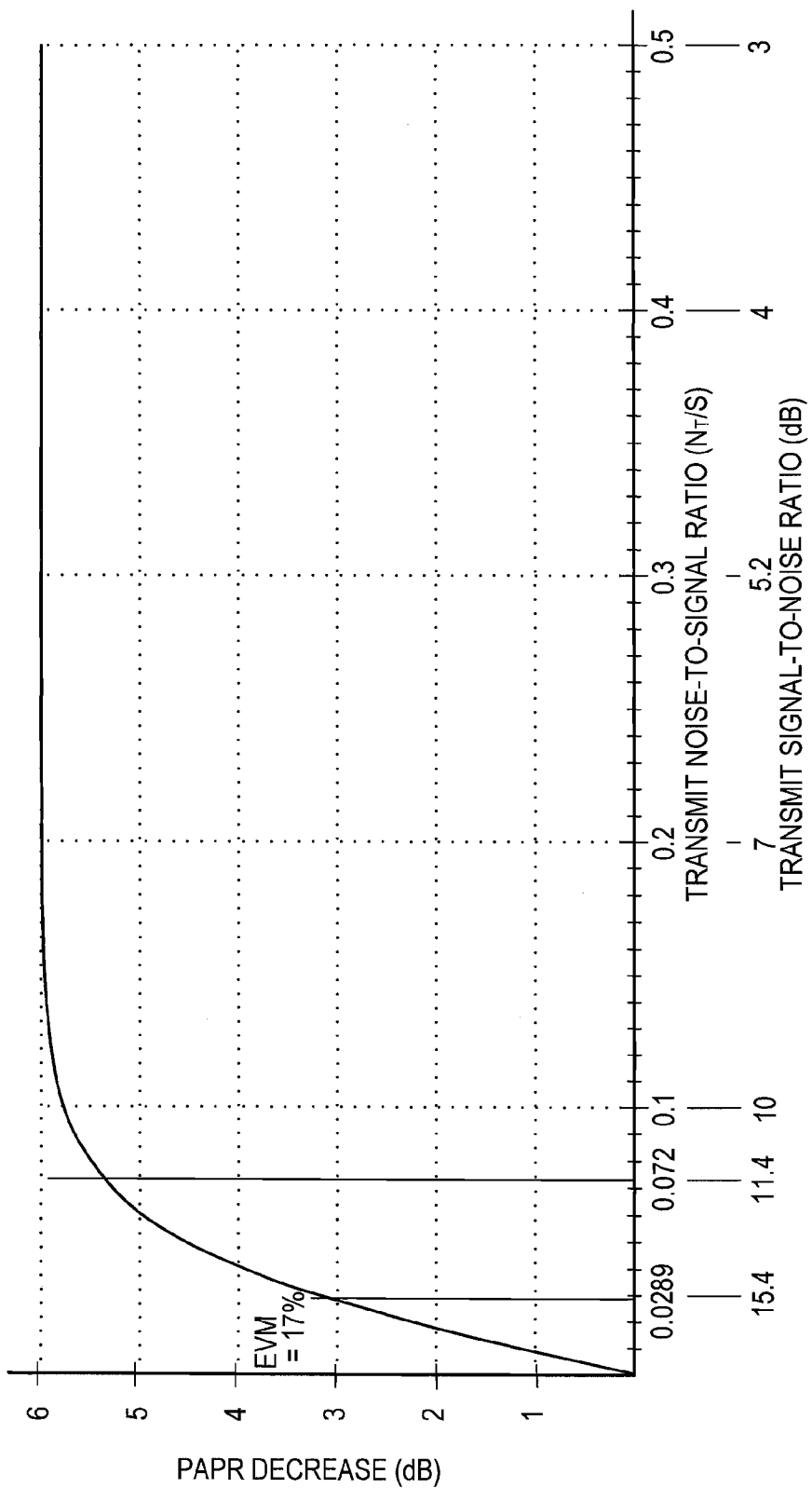
FIG. 9 shows a chart that graphically depicts an exemplary relationship between PAPR decrease and corresponding signal-to-noise ratio (SNR) for a peak-reduced signal within the transmitter of FIG. 1.

FIG. 9 shows a chart that graphically depicts an exemplary relationship between PAPR decrease and corresponding SNR for peak-reduced signal 40 within transmitter 22. FIG. 9 specifically depicts this relationship in accordance with an example that may apply to either of two standard signal modulations (LTE and EV-DO) and a relatively linear pHEMT power amplifier. FIG. 9 shows that for no added noise, no peak reduction is possible, and PAPR reduction approaches an asymptotic limit of about 6 dB as in-band peak-reduction noise 76 increases. For the precise modulation type and characteristics of amplifier section 46 depicted in FIG. 9, approximately 3.1 dB of PAPR decrease may be observed by adding the amount of noise that results in operating at the 17% EVM point of 0.0289 $N_T/S$, or equivalently an SNR of 15.4 dB.

The data depicted in FIG. 9 are desirably collected during the manufacturing process for transmitter 22 and combined with the data shown in FIG. 8 as discussed below to define equilibrium points and corresponding noise target parameters 66 for use in transmitter 22. Thus, this data characterize the particular amplifier section 46 being used in transmitter 22, and the values provided for noise target parameter 66 are matched to this particular amplifier section 46. This data may be collected for each individual transmitter 22 manufactured and all potential modulation types, or may be collected only when significant changes in amplifier technology are introduced into the manufacturing process.

Referring back to FIG. 7 at hypothetical scenario 2, the 3.1 dB PAPR decrease indicated by FIG. 9 for operation at the EVM point is now reflected in a 3.1 dB gain increase in signal $\alpha S$ and transmitter-contributed noise $\alpha N_T$ due to the normal unfrozen operation of backoff controller 60. Since transmitter-contributed noise $\alpha N_T$ is now 3.1 dB greater than in scenario 1 at −10.3 dB, and receiver thermal noise remains at 0 dB, the total noise in baseband signal 116 is now 0.4 dB relative to the receiver thermal noise. Thus, by adjusting backoff to claim the reduced-peak benefits of introducing peak-reduction noise 76 into the communication signal, signal $\alpha S$ increases 3.1 dB relative to scenario 0 while total noise $\alpha N_{R1}$ increases only 0.4 dB relative to scenario 0. This results in an SNR increase of 2.7 dB above the threshold BER requirements of 2 dB for the example of scenarios 0-5 to yield an SNR of 4.7 dB in baseband signal 116. While scenario 2 shows significant improvements over operating at scenario 0, scenario 2 is a mere hypothetical scenario that nevertheless harms link integrity, as discussed below. Desirably, transmitter 22 is not operated as indicated in scenario 2, but is rather operated as depicted in scenario 4, discussed below.

Figure 10:
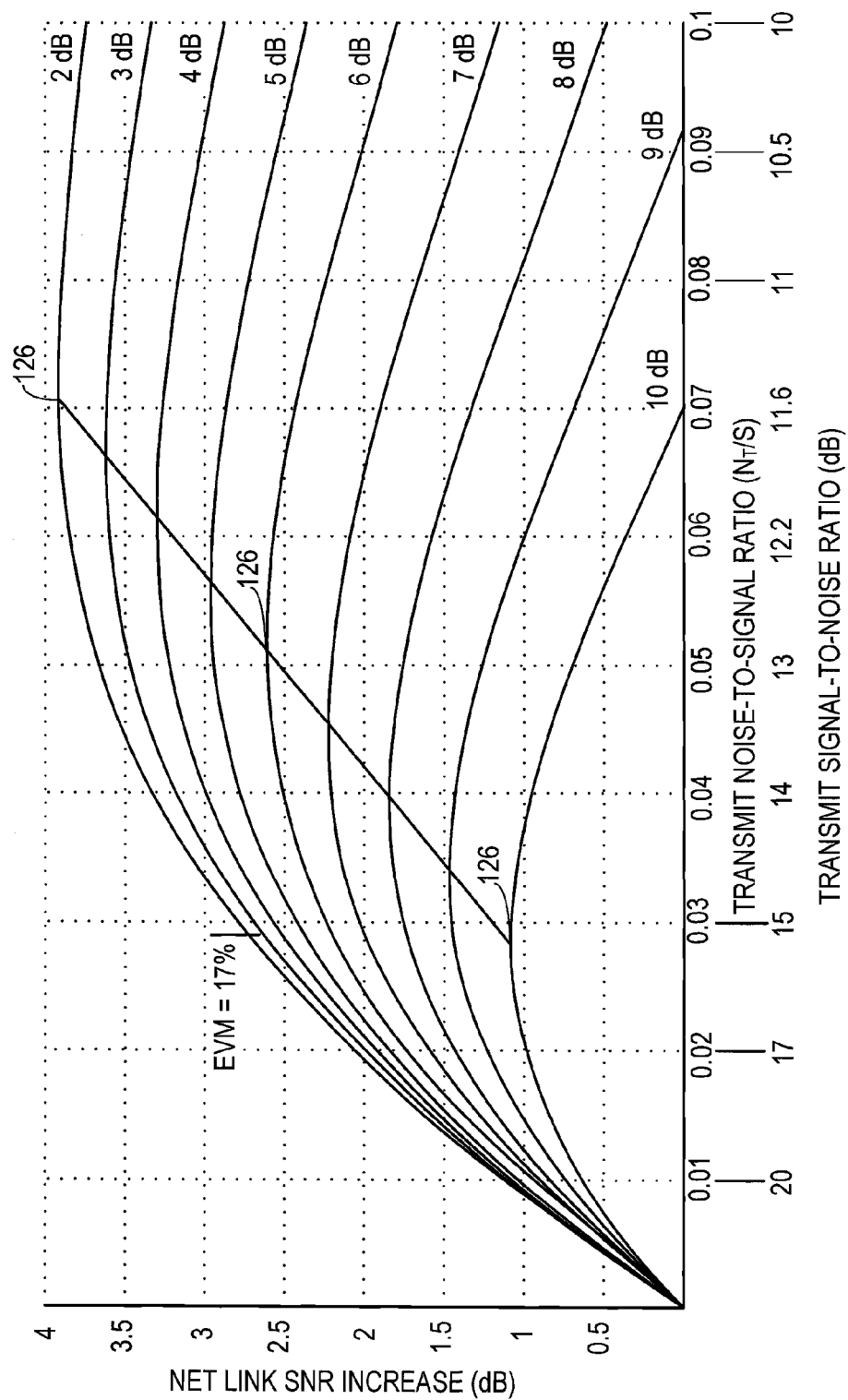
FIG. 10 shows a chart that graphically depicts an exemplary relationship between a net link SNR increase seen at a receiver's demodulator in response to corresponding SNR in an amplified signal broadcast from the transmitter of FIG. 1.

FIG. 10 shows a chart that graphically depicts an exemplary relationship between a net link SNR increase seen at demodulator 118 (FIG. 1) in response to corresponding SNR in amplified signal 26 broadcast from transmitter 22. FIG. 10 essentially combines the data from FIG. 8 with the data from FIG. 9. FIG. 10 shows that for a given threshold BER requirement imposed by modulation and coding parameters, and for the linearity and dynamic characteristics of a specific amplifier section 46 in transmitter 22, SNR in baseband signal 116 increases in response to decreasing SNR in transmitted signal 26 up to an equilibrium point 126. After equilibrium point 126, SNR in baseband signal 116 decreases in response to decreasing SNR in transmitted signal 26. For the 2 dB threshold BER curve of FIG. 10 that applies to scenarios 0-5 in FIG. 7, and for the specific amplifier section 46 characteristics described in FIG. 9, equilibrium point 126 is shown to be at about an 11.4 dB SNR in transmit signal 26.

From equilibrium point 126, a reduced SNR in baseband signal 116 presented to demodulator 118 in receiver 24 results from increasing SNR in amplified signal 26 broadcast from transmitter 22. And from equilibrium point 126, a reduced SNR in baseband signal 116 presented to demodulator 118 in receiver 24 also results from decreasing SNR in amplified signal 26 broadcast from transmitter 22. Equilibrium point 126 represents the maximum SNR point possible for receiver 24 given the characteristics of transmitter 22 expressed in the data of FIG. 9.

The data graphically presented in FIG. 10 may also be expressed using an equation. First, consider scenario 0 where substantially no transmitter-contributed noise $N_T$ is present. For scenario 0, the SNR in baseband signal 116 presented to demodulator 118 at a BER threshold can be expressed as:

$$SNR(0) \equiv \frac{\alpha S(0)}{N_{R0}}, \quad \text{EQ 1}$$

where $\alpha$ is the propagation loss factor. Now, consider scenario 2, where a certain amount of transmitter-contributed noise $N_T$ is present. For scenario 2, the SNR in baseband signal 116 presented to demodulator 118 at a given BER threshold can be expressed as:

$$SNR(N_T) \equiv \frac{\alpha \beta S(0)}{\alpha \beta N_T + N_{R0}}, \quad \text{EQ 2}$$

where $\alpha$ is the propagation loss factor and $\beta$ is the power gain caused by backoff reduction through the operation of backoff controller 60. The change in SNR between a scenario where no peak-reduction noise is added and one where peak-reduction noise has been added may then be expressed in decibels as:

$$\Delta SNR(\text{dB}) \equiv 10 \text{Log}_{10}\left[\frac{\alpha \beta S(0)/(\alpha \beta N_T + N_{R0})}{\alpha S(0)/N_{R0}}\right] = \quad \text{EQ 3}$$
$$10\text{Log}_{10}[\beta] - 10\log_{10}\left[1 + \left(\frac{\alpha \beta N_T}{N_{R0}}\right)\right].$$

Link SNR will be enhanced whenever $\Delta SNR(\text{dB})$ is positive, and degraded whenever it is negative. The first term is simply the amount that average transmitted signal power can be increased by peak reduction processing, which produces an in-band transmit noise of $N_T$. The second term is the increase in total link noise. The variable $\beta$ is characterized by the transmitter-specific data presented in FIG. 9 which describe and are matched to the specific characteristics of amplifier section 46, including for example, dynamic range and range of linear operation.

The receiver thermal noise $N_{R0}$ is not known. But communication systems seek to operate their communication links near the BER threshold for the highest capacity set of modulation and coding parameters that can be accommodated by any given SNR. Thus, one can fairly assume at any instant that:

$$N_{R0} \cong \frac{\alpha S(0)}{SNR(M, R, B_0)}, \quad \text{EQ 4}$$

where $SNR(M,R,B_0)$ is the threshold SNR for a given modulation type, coding rate, and BER. By substitution, the increase in SNR for baseband signal 116 may then be expressed as:

$$\Delta SNR(\text{dB}) \cong 10 \text{Log}_{10}[\beta] - 10 \log_{10}\left[1 + \beta SNR\left(\frac{\beta N_T}{S(0)}\right)\right]. \quad \text{EQ 5}$$

Equation 5 and FIG. 10 show that equilibrium point 126 is established in response to an equation that has a first term which characterizes power increases in amplified signal 26 achievable by reducing backoff in response to increasing the peak-reduction noise 76 being combined with modulated signal 36, and a second term that characterizes how noise increases relative to amplified signal 26 at demodulator 118 of receiver 24 at a threshold bit error rate in response to increasing peak-reduction noise 76 being combined with modulated signal 36. In particular, for a given set of modulation and coding parameters, equilibrium point 126 equals the SNR of amplified signal 26 where the derivative of equation 5 equals zero, which is the point where the relevant curve of FIG. 10 has a slope of zero.

Referring back to FIG. 7, for hypothetical scenario 3 backoff controller 60 is again hypothetically frozen to prevent any gain change from occurring in response to peak-reduction operations. But using the equilibrium point 126 shown in FIG. 10 of about an 11.4 dB SNR in transmitted signal 26 at the 2 dB threshold BER from FIG. 10, scenario 3 depicts that transmitter noise $\alpha N_T$ is increased to −6.3 dB, which is −11.4 dB relative to the signal level $\alpha S$ of 5.1 dB. The increase in transmitter noise $\alpha N_T$ causes total receiver noise $N_{R1}$ to increase to 0.9 dB, reflecting a lower SNR for both transmitted signal 26 and for baseband signal 116 in receiver 24 when compared to scenario 2.

Desirably, transmitter 22 operates at equilibrium point 126. Looking now to actual scenario 4, backoff controller 60 is unfrozen to allow amplifier section 46 to achieve its maximum amplification while maintaining linearity. This bonds noise and signal levels in transmitted signal 26 together again. The transmitter-specific data from FIG. 9 indicates that about 5.4 dB of PAPR decrease can be achieved by operating at an SNR of 11.4 dB in this example, and in scenario 4, that 5.4 dB is translated into a 5.4 dB increase in signal $\alpha S$ compared to scenario 0, or a 2.3 dB increase compared to scenario 3. This increase in gain also applies to transmitter noise $\alpha N_T$, which is now 2.3 dB higher than in scenario 3 at −4 dB relative to the receiver thermal noise $N_{R0}$. The increase in transmitter noise $\alpha N_T$ causes total noise $N_{R1}$ in baseband signal 116 to increase to 1.45 dB, yielding an SNR for baseband signal 116 of 5.95 dB. While transmitter SNR remains at the same lower level it had in scenario 3, the SNR for baseband signal 116 is now increased compared to that in scenario 3.

By operating transmitter 22 at the scenario 4 equilibrium point 126 compared to the EVM point of scenario 2, a highly significant 1.25 dB increase in SNR for baseband signal 116 is obtained. This increase results even though SNR at transmitter 22 decreases from 15.4 dB to 11.4 dB by operating at equilibrium point 126 compared to the EVM point of scenario 2. This increase in link SNR can lead to an increase in channel data capacity of around 0.4 bps/Hz in accordance with the well-known Shannon-Hartley capacity-versus-SNR relationship.

Moreover, communication robustness improves while operating at equilibrium point 126 compared to the EVM point. Operation at equilibrium point 126 provides greater immunity to interference. Interference represents another form of noise to receiver 24. When a given amount of interference is present and has a given amount of influence while operating at the hypothetical EVM point of scenario 2, that same amount of interference will have 1.05 dB less influence when operating at equilibrium point 126 of scenario 4. The 1.05 dB improvement results because total receiver noise $N_{R1}$ is 1.05 dB greater when operating at equilibrium point 126.

Similarly, operating transmitter 22 at equilibrium point 126 provides greater immunity to fades. During a fade, both signal $\alpha S$ and transmitter noise $\alpha N_T$ become attenuated by about the same amount. When operating at the EVM point of scenario 2, transmitter noise $\alpha N_T$ is far less than receiver thermal noise $N_{R0}$ and makes little contribution to the total noise $N_{R1}$ in baseband signal 116. When a fade occurs while operating at the EVM point of scenario 2, total noise $N_{R1}$ decreases very little, while signal $\alpha S$ experiences the full fade. In contrast, at the equilibrium point 126 of scenario 4, transmitter noise $\alpha N_T$ makes considerably more of a contribution to the total noise $N_{R1}$ in baseband signal 116. Thus, when a fade occurs total noise $N_{R1}$ decreases much more than occurs while operating at the EVM point of scenario 2. During a fade, the SNR of baseband signal 116 will decrease less while operating at equilibrium point 126 than when operating at other points to the left of equilibrium point 126 in FIG. 10, including the EVM point of scenario 2.

Improved and more robust link performance also results when operating with a transmitter 22 that has unusually noisy or worst-case-noisy analog components. For many transmitters 22 in communication system 20, any in-band noise $N_T$ present with peak-reduction noise at zero is at a low level and may be ignored for purposes of the present invention. But, values of analog components vary, analog components age, and analog components experience temperature dependencies that may make this form of transmitter-contributed noise occasionally much higher in a worst-case situation. When operating with a noisy transmitter, peak controller 38 will detect the excessive noise and limit peak-reduction noise 76 to that additional amount that meets noise target parameter 66. Less peak-reduction noise 76 will be added to the communication signal than occurs in a less noisy transmitter 22. With less added peak-reduction noise 76, backoff controller 60 will be less effective in increasing amplification, and the net link SNR increase will be reduced from the values suggested in FIG. 10.

This noisy-transmitter effect would be severe if operating at or around the EVM point due to the steepness of the left sides of the curves shown in FIG. 10. This is the region where a decrease in peak-reduction noise 76 leads to a significant decrease for receiver SNR in baseband signal 116. But with transmitter 22 operating at equilibrium point 126, transmitter 22 is operating at the flat part of the curves shown in FIG. 10.

As a consequence, modest increases or decreases in peak-reduction noise 76 (or other noise) make little difference for receiver SNR in baseband signal 116. Any noise contributed by analog components in transmitter 22 makes less of a contribution to total receiver noise $N_{R1}$, and nearly the full amount of net link SNR increase indicated in FIG. 10 is still available to transmitter 22. With reference to the 2 dB curve in FIG. 10, for a noisy transmitter 22 situation the SNR of baseband signal 116 in receiver 24 may experience an increase of more than 3.5 dB when operating at equilibrium point 126 when compared to operating at the EVM point. The operation of transmitters 22 at their equilibrium points 126 leads to considerably more robust communication links for those transmitters 22 that are unusually noisy notwithstanding any added peak-reduction noise 76.

And, operation of transmitter 22 at the EVM point of scenario 2 or other points to the left of equilibrium point 126 in FIG. 10 causes more switching chatter while changing between different modulation and coding parameters in an attempt to take full advantage of whatever SNR is provided in baseband signal 116. This excessive switching chatter causes the communication link to be less robust than can be obtained while operating at equilibrium point 126.

When a base station or other controlling entity detects that a communication link is delivering a greater SNR than required to meet the currently specified threshold BER, then that controlling entity will instruct that transmitter 22 to subsequently operate at a higher threshold BER in order to efficiently use the available spectrum. For example, transmitter 22 may be instructed to switch from a 2 dB curve in FIG. 10 to a 6 dB curve to take advantage of a higher SNR that may be available under current conditions. If transmitter 22 were to operate at the EVM point of scenario 2, then after making the switch the value of the EVM point at which the transmitter is attempting to comply would change to a lower value in accordance with industry standard EVM specifications. In other words, transmitter 22 would begin to operate at a higher SNR, which would have the unwanted effect of achieving a lower SNR in baseband signal 116. In many situations, the SNR of baseband signal 116 will be lowered to a sufficient degree that the communication link will no longer be able to support the higher threshold BER and modulation/coding parameters will need to change again.

In contrast, when transmitter 22 operates at equilibrium point 126 of scenario 4, then after making the switch, the value of equilibrium point 126 would again change. But after this change transmitter 22 would be operating to the right of the equilibrium point 126 in FIG. 10, would raise its transmitter SNR to meet the new equilibrium point 126 value, and this would raise the receiver SNR of baseband signal 116. When operating at equilibrium point 126, after any change in modulation or coding parameters, whether to support a higher or lower threshold BER, transmitter 22 will adapt to a new equilibrium point 126 value that will deliver higher SNR in baseband signal 116 than was present at the moment of change. Consequently, nothing the transmitter does in controlling its SNR will necessitate another modulation or coding parameter change. This leads to improved robustness in the communication link.

FIG. 10 and scenarios 0-4 in FIG. 7 show that any increase in SNR for transmitted signal 26 away from equilibrium point 126 leads to a decrease in SNR for baseband signal 116. FIG. 10 and hypothetical scenario 5 in FIG. 7, show the same undesirable result happens for decreases in transmitter SNR away from equilibrium point 126. Hypothetical scenario 5 depicts operation at an arbitrary point where transmit SNR is around 10.5 dB, which is lower than the 11.4 dB SNR of actual scenario 4. In scenario 5, backoff controller 60 remains in its normal unfrozen mode of operation where it continuously adjusts gain for amplifier section 46. But as shown in FIG. 9, only an additional 0.28 dB of signal gain can be obtained for the 0.9 dB increase in peak-reduction noise 76. And, that 0.28 dB of gain applies to both the signal $\alpha S$ as well as the transmitter noise $\alpha N_T$. So, the total noise $N_{R1}$ seen at demodulator 118 increases by 0.39 dB to 1.84 dB. The net result is that the SNR of baseband signal 116 has decreased by 0.11 dB from operating at the equilibrium point 126 of scenario 4.

Scenarios 0-3 and 5 are hypothetical scenarios only and are presented herein for comparison purposes with actual scenario 4. Transmitter 22 desirably avoids operating at any of scenarios 0-3 and 5 by causing equilibrium estimator 64 to operate at the estimate of equilibrium point 126 for any given set of modulation and coding parameters. Moreover, backoff controller 60 remains unfrozen during normal operation, makes continuous adjustments to the amplification provided by amplifier section 46, and tracks changes in the PAPR of peak-reduced signal 40.

In summary, at least one embodiment of the present invention provides a transmitter that operates at an estimate of its equilibrium point. The equilibrium point is that signal-to-noise ratio (SNR) for the signal broadcast from the transmitter where a demodulator in the receiver will experience a reduced SNR if the transmitted signal SNR either increases or decreases. In at least one embodiment of the present invention, the estimated equilibrium point is determined in response to the actual PAPR reduction achievable through a peak reduction process in the transmitter. In at least one embodiment of the present invention, the SNR of the signal demodulated in a receiver exhibits increasing SNR as the SNR of the transmitted signal decreases up to the equilibrium point. In at least one embodiment of the present invention, improvements in link robustness result from operating the transmitter at its equilibrium point rather than an externally imposed noise specification.

Although the preferred embodiments of the invention have been illustrated and described in detail, it will be readily apparent to those skilled in the art that various modifications and adaptations may be made without departing from the spirit of the invention or from the scope of the appended claims. For example, those skilled in the art will appreciate that the specific functions depicted herein through the use of block diagrams and circuit diagrams may be partitioned in equivalent but different ways than shown and discussed herein. Such equivalent but different ways and the modifications and adaptations which may be implemented to achieve them are to be included within the scope of the present invention. Likewise, while certain operational conditions have been mentioned herein for the purposes of teaching the invention, the invention may be applied in connection with other operational conditions. These and other equivalent modifications and adaptations are included within the scope of the present invention.

What is claimed is:

1. A transmitter configured to broadcast an amplified signal capable of being demodulated at a receiver having a front-end section and a demodulator section, said transmitter comprising:

a peak controller which controls a peak-to-average-power ratio (PAPR) parameter of a peak-reduced signal by adjusting an amount of peak-reduction noise combined with a modulated signal in said peak controller to form said peak-reduced signal;

an amplifier section coupled to said peak controller and configured to apply amplification to said peak-reduced signal at a controllable input power backoff level and corresponding degree of linearity and to generate said amplified signal;

a backoff controller coupled to said amplifier section, said backoff controller being configured to continuously adjust said input power backoff level of said amplifier section to maximize said amplification while maintaining a predetermined degree of linearity;

an equilibrium estimator coupled to said peak controller, said equilibrium estimator being configured to provide an estimate of an equilibrium point at which:

a reduced signal-to-noise ratio at said demodulator section of said receiver results from increasing a signal-to-noise ratio in said amplified signal broadcast from said transmitter; and a reduced signal-to-noise ratio at said demodulator section of said receiver also results from decreasing said signal-to-noise ratio in said amplified signal broadcast from said transmitter;

wherein said peak controller is configured to combine an amount of said peak-reduction noise with said modulated signal that causes said transmitter to operate at said estimate of said equilibrium point.

2. A transmitter as claimed in claim 1 wherein said peak controller is configured so that said peak-reduction noise exhibits substantially the same bandwidth as said modulated signal.

3. A transmitter as claimed in claim 1 wherein:

said signal-to-noise ratio for said amplified signal broadcast from said transmitter is increased by decreasing said peak-reduction noise combined with said modulated signal in said peak controller to cause increased peaks in said peak-reduced signal; and said backoff controller is configured to respond to said increased peaks in said peak-reduced signal by increasing said input power backoff level.

4. A transmitter as claimed in claim 1 wherein:

said signal-to-noise ratio for said amplified signal broadcast from said transmitter is decreased by increasing said peak-reduction noise combined with said modulated signal in said peak controller to cause decreased peaks in said peak-reduced signal; and said backoff controller is configured to respond to said decreased peaks in said peak-reduced signal by decreasing said input power backoff level.

5. A transmitter as claimed in claim 1 wherein said equilibrium estimator is configured so that said equilibrium point is responsive to thermal noise generated in said front end of said receiver.

6. A transmitter as claimed in claim 1 wherein said equilibrium estimator is responsive to modulation parameters which describe said modulated signal.

7. A transmitter as claimed in claim 1 wherein:

said modulated signal is error-correction encoded at a code rate; and said equilibrium estimator is configured so that said estimate of said equilibrium point is responsive to said code rate.

8. A transmitter as claimed in claim 1 wherein:

said modulated signal is error-correction encoded to accommodate a predetermined bit error rate; and said equilibrium estimator is configured so that said estimate of said equilibrium point is responsive to said bit error rate.

9. A transmitter as claimed in claim 1 wherein:

said equilibrium estimator is provided by a memory which stores said estimated equilibrium point as a constant value representing an amount of peak-reduction noise divided by a modulated signal level at said equilibrium point; and said peak controller comprises a multiplier which multiplies said estimated equilibrium point by a modulated signal magnitude parameter to obtain an amount of peak-reduction noise to be added to said modulated signal in order to deliver peak reduction and controllable input power backoff at said estimated equilibrium point.

10. A transmitter as claimed in claim 1 wherein said equilibrium estimator is configured to establish said estimate of said equilibrium point in response to empirical measurements of peak-to-average power ratio decrease in said peak-reduced signal relative to said modulated signal in response to differing values for a ratio between peak-reduction noise and modulated signal level.

11. A transmitter as claimed in claim 1 wherein said equilibrium estimator is configured to establish said estimate of said equilibrium point in response to calculated noise increases at said demodulation section of said receiver at a threshold bit error rate of a predetermined modulation type and a predetermined coding parameter set for differing values of a ratio between peak-reduction noise and modulated signal level.

12. A transmitter as claimed in claim 1 wherein said equilibrium estimator is configured to establish said estimate of said equilibrium point in response to an equation that has:

a first component which characterizes power increases in said amplified signal achievable by reducing backoff in response to increasing said peak-reduction noise being combined with said modulated signal; and a second component which characterizes how noise increases relative to said amplified signal at said demodulator section of said receiver at a threshold bit error rate in response to increasing said peak-reduction noise being combined with said modulated signal.

13. A transmitter as claimed in claim 1 wherein said equilibrium estimator is configured so that said equilibrium point is matched with specific characteristics of said amplifier section.

14. A communication system exhibiting robust communication links, said system comprising:

a receiver having a front-end section and a demodulator section; and a transmitter configured to broadcast an amplified signal capable of being demodulated at said receiver, said transmitter comprising:

a peak controller which controls a peak-to-average-power ratio (PAPR) parameter of a peak-reduced signal by adjusting an amount of peak-reduction noise combined with a modulated signal in said peak controller to form said peak-reduced signal;

an amplifier section coupled to said peak controller and configured to apply amplification to said peak-reduced signal at a selectable input power backoff level and corresponding degree of linearity and to generate said amplified signal;

a backoff controller coupled to said amplifier section, said backoff controller being configured to continuously adjust said input power backoff level of said amplifier section to maximize said amplification while maintaining a predetermined degree of amplifier linearity;

an equilibrium estimator coupled to said peak controller, said equilibrium estimator being configured to provide an estimate of an equilibrium point at which a reduced a signal-to-noise ratio at said demodulator section of said receiver results from increasing a signal-to-noise ratio in said amplified signal broadcast from said transmitter, and a reduced signal-to-noise ratio at said demodulator section of said receiver also results from decreasing said signal-to-noise ratio in said amplified signal broadcast from said transmitter; and wherein said peak controller is configured to combine an amount of said peak-reduction noise with said modulated signal that causes said transmitter to operate at said estimated equilibrium point.

15. A communication system as claimed in claim 14 wherein:
said signal-to-noise ratio for said amplified signal broadcast from said transmitter is increased by decreasing said peak-reduction noise combined with said modulated signal in said peak controller to cause increased peaks in said peak-reduced signal; and
said backoff controller is configured to respond to said increased peaks in said peak-reduced signal by increasing said input power backoff level.

16. A communication system as claimed in claim 14 wherein:
said signal-to-noise ratio for said amplified signal broadcast from said transmitter is decreased by increasing said peak-reduction noise combined with said modulated signal in said peak controller to cause decreased peaks in said peak-reduced signal; and
said backoff controller is configured to respond to said decreased peaks in said peak-reduced signal by decreasing said input power backoff level.

17. A communication system as claimed in claim 14 wherein said equilibrium estimator is configured so that said equilibrium point is responsive to thermal noise generated in said front end of said receiver.

18. A communication system as claimed in claim 14 wherein said equilibrium estimator is configured to establish said estimate of said equilibrium point in response to calculated noise increases at said demodulation section of said receiver at a threshold bit error rate of a predetermined modulation type and a predetermined coding parameter set for differing values of a ratio between peak-reduction noise and modulated signal level.

19. A communication system as claimed in claim 14 wherein said equilibrium estimator is configured so that said equilibrium point is matched with specific characteristics of said amplifier section.

20. A method of operating a transmitter configured to broadcast a peak-reduced amplified signal capable of being demodulated at a receiver having a front-end section and a demodulator section, said method comprising:
generating peak-reduction noise from a modulated signal;
combining said peak-reduction noise with a delayed version of said modulated signal in a peak controller to form a peak-reduced signal which exhibits a lower peak-to-average-power ratio (PAPR) parameter than is exhibited by said modulated signal;
applying amplification to said peak-reduced signal in an amplifier section which operates at a selectable input power backoff level and at a corresponding degree of amplifier linearity and which generates said amplified signal;
continuously adjusting said input power backoff level of said amplifier section to maximize said amplification while maintaining a predetermined degree of amplifier linearity; and
estimating an equilibrium point at which a reduced a signal-to-noise ratio at said demodulator section of said receiver results from increasing a signal-to-noise ratio in said amplified signal broadcast from said transmitter, and a reduced signal-to-noise ratio at said demodulator section of said receiver also results from decreasing said signal-to-noise ratio in said amplified signal broadcast from said transmitter;
wherein said peak-reduction noise is combined with said modulated signal in an amount that causes said transmitter to operate at said estimated equilibrium point.

21. A method as claimed in claim 20 wherein said peak-reduction noise is generated to exhibit substantially the same bandwidth as is exhibited by said modulated signal.

22. A method as claimed in claim 20 wherein
said signal-to-noise ratio for said amplified signal broadcast from said transmitter is increased by decreasing said peak-reduction noise combined with said modulated signal in said peak controller to cause increased peaks in said peak-reduced signal; and
said continuously adjusting step responds to said increased peaks in said peak-reduced signal by increasing said input power backoff level.

23. A method as claimed in claim 20 wherein:
said signal-to-noise ratio for said amplified signal broadcast from said transmitter is decreased by increasing said peak-reduction noise combined with said modulated signal in said peak controller to cause decreased peaks in said peak-reduced signal; and
said continuously adjusting step responds to said decreased peaks in said peak-reduced signal by decreasing said input power backoff level.

24. A method as claimed in claim 20 wherein said equilibrium point is responsive to thermal noise generated in said front end of said receiver.

25. A method as claimed in claim 20 wherein said estimating step is configured so that said estimated equilibrium point is responsive to modulation parameters which describe said modulated signal.

26. A method as claimed in claim 20 wherein:
said modulated signal is error-correction encoded at a code rate; and
said estimating step is configured so that said estimated equilibrium point is responsive to said code rate.

27. A method as claimed in claim 20 wherein:
said modulated signal is error-correction encoded to accommodate a predetermined bit error rate; and
said estimating step is configured so that said estimate of said equilibrium point is responsive to said bit error rate.

28. A method as claimed in claim 20 wherein said estimating step is configured to establish said estimate of said equilibrium point in response to an equation that has:
a first component which characterizes power increases in said amplified signal achievable by reducing backoff in response to increasing said peak-reduction noise being combined with said modulated signal; and
a second component which characterizes how noise increases relative to said amplified signal at said demodulator section of said receiver at a threshold bit error rate in response to increasing said peak-reduction noise being combined with said modulated signal.

29. A method as claimed in claim 20 wherein said estimating step is configured so that said equilibrium point is matched with specific characteristics of said amplifier section.

* * * * *